United States Patent [19]

Myers et al.

[11] 4,317,387

[45] Mar. 2, 1982

[54] TELESCOPING STEERING ASSEMBLY

[75] Inventors: Ronald I. Myers, Beachwood; Charles W. Rader, Willowick, both of Ohio

[73] Assignee: General Motors Corporation, Detroit, Mich.

[21] Appl. No.: 152,726

[22] Filed: May 23, 1980

[51] Int. Cl.³ .......................... B62D 1/18; G05G 5/18
[52] U.S. Cl. ........................................ 74/493; 74/527; 403/108; 403/109; 403/328
[58] Field of Search .................. 74/493, 527; 403/108, 403/328, 109

[56] References Cited

U.S. PATENT DOCUMENTS

| | | | |
|---|---|---|---|
| 1,610,069 | 12/1926 | Weber | 74/527 X |
| 2,075,110 | 3/1937 | Garretson | 74/493 |
| 2,910,887 | 11/1959 | Helms | 74/493 |
| 4,165,854 | 8/1979 | Duly | 403/328 X |

Primary Examiner—Allan D. Herrmann
Attorney, Agent, or Firm—Edward J. Biskup

[57] ABSTRACT

A telescoping steering assembly having an upper column supported by a lower column for axial movement between two extreme positions. The upper column carries a lock pin located in a groove formed in the lower column, and the lock pin is relatively movable into one of a plurality of openings formed in the groove to lock the upper column in an adjusted position.

2 Claims, 3 Drawing Figures

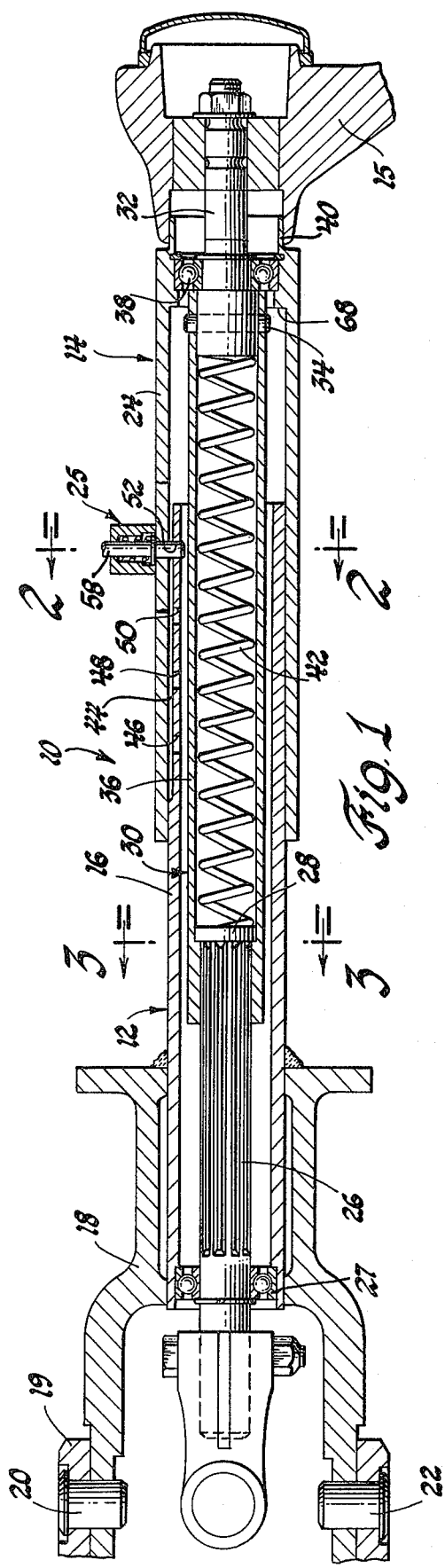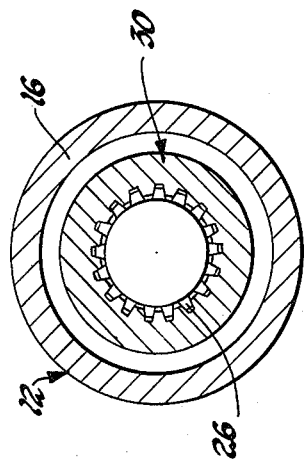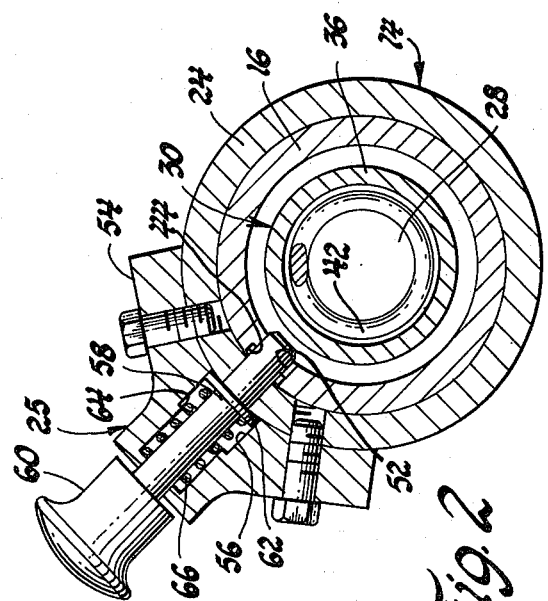

TELESCOPING STEERING ASSEMBLY

This invention relates to steering mechanisms in general and, more particularly, to a steering assembly which allows longitudinal adjustment thereof so that the steering wheel can assume various positions relative to a vehicle driver.

More specifically, the present invention concerns a telescoping steering assembly which comprises a fixed lower column that supports a lower steering shaft formed with an enlarged head at the upper end thereof. An upper column is supported by the lower column for axial movement relative to the latter between two extreme positions. An upper steering shaft forms a part of the upper column and includes a stub shaft fixed to a hollow cylindrical member, the lower end of which is splined to the lower steering shaft. First bearing means are provided for supporting the lower end of the lower steering shaft for rotation in the lower column, and second bearing means are provided for supporting the stub shaft in the upper column. The outer surface of the lower column has a longitudinally extending groove formed therein which has a plurality of axially spaced openings each of which is adapted to receive a lock pin carried by the upper column. The lock pin is normally located within the groove and moves into one of the openings for locking the upper and lower columns together against relative telescoping movement. The lock pin is mounted within a housing fixed with the upper column that includes cooperating stop means for locating and maintaining the inner end of the lock pin within the groove when the lock pin is in the extended and retracted positions so as to prevent relative rotational movement between the upper and lower columns. In addition, a spring is provided within the cylindrical member with one end engaging the enlarged head and the other end engaging the stub shaft for continuously urging the upper column away from the lower column.

The objects of the present invention are to provide a new and improved telescoping steering assembly having locking means that are simple and inexpensive to manufacture and durable in operation; to provide a new and improved steering assembly having relatively longitudinally movable upper and lower columns with one of the columns provided with a locking device which has a movable lock pin mounted in a housing which includes cooperating means for locating the lock pin in a groove so as to prevent relative rotational movement between the upper and lower columns; and to provide a new and improved steering assembly having relatively telescoping upper and lower columns that are continuously biased outwardly relative to each other and include a locking device which prevents relative rotational movement between the upper and lower columns and provides positive positioning of the upper column relative to the lower column.

Other objects and advantages of the present invention will be more apparent from the following detailed description when taken with the accompanying drawings, in which:

FIG. 1 is a sectional view of the steering assembly made in accordance with the invention;

FIG. 2 is an enlarged sectional view taken on line 2—2 of FIG. 1; and

FIG. 3 is an enlarged sectional view taken on line 3—3 of FIG. 1.

Referring to the drawing, the steering assembly 10 made in accordance with the present invention comprises a fixed lower column 12 which slidably supports an upper column 14 that terminates with a steering wheel 15. The lower column 12 includes a lower jacket member 16 fixed to a clevis 18 which, in turn, is pivotally connected to a support member 19 by a pair of horizontally aligned pivot pins 20 and 22. The upper end of the lower jacket member 16 is telescopically received within the lower end of an upper jacket member 24 which forms a part of the upper column 14. The upper jacket member 24 carries a lock device 25 for maintaining adjusted relative positions of the lower column 12 and the upper column 14, as will be more fully explained hereinafter. In addition, it will be noted that, although not shown, the steering assembly 10 is intended to be supported by a tilt steering wheel mechanism, such as disclosed in U.S. Pat. No. 3,718,053 which issued on Feb. 27, 1973 in the name of James J. Cinadr, and is assigned to the assignee of this invention. The tilt steering wheel mechanism permits the steering assembly 10 to be adjusted in position about a horizontal axis passing through the centers of the pivot pins 20 and 22.

A lower steering shaft 26 is concentrically located within the lower column 12 and has its lower end rotatably supported by a ball bearing assembly 27 while its upper end is formed with an enlarged circular head 28. The lower steering shaft 26 is connected by a spline connection to an upper steering shaft 30 which comprises a stub shaft 32 fixed by a transversely extending pin 34 to a hollow cylindrical member 36. The cylindrical member 36 is housed within the upper jacket member 24, the upper portion of which carries a ball bearing assembly 38 which rotatably supports the lower portion of the stub shaft 32. The upper portion of the stub shaft 32 fixedly supports the steering wheel 15 which, in turn, is concentric with the extension 40, which is the upper end of the upper jacket member 24. Thus, when the steering wheel 15 is rotated, corresponding rotation of the lower steering shaft 26 and the upper steering shaft 30 occurs. In addition, the spline connection between the lower steering shaft 26 and the upper steering shaft 30 permits relative axial movement between the latter-mentioned shafts. In this regard, it will be noted that a coil spring 42 is located within the cylindrical member 36, with one end of the spring 42 contacting the enlarged head 28 and the other end contacting the stub shaft 32 for continuously urging the upper column 14 away from the lower column 12. It will also be noted that the upper portion of the lower jacket member 16 is formed with a longitudinally extending groove 44 which has a plurality of equally spaced and identically sized circular openings 46, 48, 50, and 52 formed therein.

As best seen in FIGS. 1 and 2, the lock device 25 associated with the upper column 14 includes a housing 54 that is bolted to the upper jacket member 24. The housing 54 is formed with a stepped bore 56 that receives a lock pin 58, the outer end of which is fixed with a knob 60 and the inner end of which is chamfered and adapted to extend into one of the openings 46, 48, 50 and 52 formed in the groove 44 in the upper portion of the lower jacket member 16. A ring member 62 is rigidly fixed to an intermediate portion of the lock pin 58 and is adapted to engage a shoulder 64 formed in the bore 56 when the knob 60 is moved outwardly relative to the housing 54. As a result, the inner end of the lock pin 58 is withdrawn from the accommodating opening 52, as seen in FIG. 2. Similarly, the ring member 62 serves as a stop which engages the outer surface of the upper jacket member 24 for limiting inward movement of the lock pin 58. In this regard, it will be noted that a coil spring 66 encircles the lock pin 58 and serves to normally bias the latter towards and into the opening 52, as seen in FIG. 2. It will also be noted that when the lock pin 58 is retracted from the accommodating opening 52, the ring member 62 engages the shoulder 64 at a point where the chamfered inner end of the lock pin 58 is still located within the groove 44 formed in the lower jacket member 16. Thus, the lock pin 58 serves to prevent relative rotational movement between the upper jacket member 24 and the lower jacket member 16 when the lock pin 58 is extended into one of the openings 46, 48, 50, and 52 and during the time when it is retracted therefrom.

From the above description it should be apparent that when the parts of the steering assembly 10 are located as shown in FIG. 1, the upper column 14 and the steering wheel 15 are in the fully raised positions and are maintained therein by the inner end of the lock pin 58 being located in the opening 52 formed in the groove 44 of the lower jacket member 16. If the vehicle operator should wish to lower the steering wheel 15 from this position, he merely grasps the knob 60 and pulls it outwardly until the ring member 62 engages the shoulder 64 formed in the bores 56. At such time, the inner end of the lock pin 58 is fully retracted from the opening 52 but it is still located within the groove 44. While maintaining the lock pin 58 in the retracted position, the vehicle operator then pushes downwardly on the steering wheel 15 against the bias of the spring 42. Simultaneously, he releases the knob 60 and allows the lock pin 58 to slide within the groove 44 until it comes to the next opening 50 at which point the spring 66 causes the lock pin 58 to extend inwardly into the opening 50 and lock the upper column 14 against further axial movement. If the vehicle operator should wish to have the steering wheel 15 located in the fully lowered position from the fully raised position shown in FIG. 1, he would maintain the lock pin 58 fully retracted while pushing down on the steering wheel 15 until the upper end of the lower jacket member 16 contacts a shoulder 68 formed with the upper jacket member 24 adjacent ball bearing assembly 38. He would then release the knob 60 permitting the lock pin 58 to extend into the opening 46 in groove 44 formed in the lower jacket member 16. In this manner, the position of the steering wheel 15 can be adjusted, it being understood that if the vehicle operator subsequently wishes to have the steering wheel 15 raised from the fully lowered position, he merely retracts the lock pin 58 from the opening 46 and allows the spring 42 to raise the steering wheel 15 to the desired position.

Various changes and modifications can be made in this construction without departing from the spirit of the invention. Such changes and modifications are contemplated by the inventors and they do not wish to be limited except by the scope of the appended claims.

The embodiments of the invention for which an exclusive property or privilege is claimed are defined as follows:

1. A telescoping steering assembly comprising a fixed lower column supporting a lower steering shaft formed with an enlarged head at the upper end thereof, an upper column supported by said lower column for axial movement relative to said lower column between two extreme positions; an upper steering shaft including a stub shaft fixed to a hollow cylindrical member and housed within said upper column, a splined connection joining the lower end of said cylindrical member to said lower steering shaft; first bearing means supporting the lower end of said lower steering shaft for rotation in said lower column; second bearing means supporting said stub shaft for rotation in said upper column, a groove formed in the outer surface of said lower column, said groove having a plurality of axially spaced openings formed therein, a lock pin carried by said upper column and having an extended position wherein one end of said lock pin is located within one of said openings for locking said upper column and said lower column against relative telescoping movement, said lock pin having a retracted position wherein said one end of said lock pin is located in said groove; cooperating stop means for maintaining said one end of said lock pin in said groove when said lock pin is in said extended position or in said retracted position so as to prevent relative rotational movement of said upper and lower columns; and a spring located within said cylindrical member with one end of said spring engaging said enlarged head of said lower steering shaft and the other end of said spring engaging said stub shaft for continuously urging said upper column away from said lower column.

2. A telescoping steering assembly comprising a fixed lower column supporting a lower steering shaft formed with an enlarged head at the upper end thereof, an upper column supported by said lower column for axial movement relative to said lower column between two extreme positions; an upper steering shaft including a stub shaft fixed to a hollow cylindrical member and housed within said upper column, a splined connection joining the lower end of said cylindrical member to said lower steering shaft; first bearing means supporting the lower end of said lower steering shaft for rotation in said lower column; second bearing means supporting said stub shaft for rotation in said upper column, a groove formed in the outer surface of said lower column along the longitudinal axis thereof, said groove having a plurality of uniformly spaced openings formed therein, a housing mounted to the outer surface of said upper column, a lock pin carried by said housing for axial movement and having an extended position wherein one end of said lock pin is located within one of said openings for locking said upper column and said lower column against relative telescoping movement, said lock pin having a retracted position wherein one end of said lock pin is located in said groove; cooperating stop means formed on said lock pin and said housing for maintaining said one end of said lock pin in said groove when said lock pin is in said extended position or in said retracted position so as to prevent relative rotational movement of said upper and lower columns; and a spring located within said cylindrical member with one end of said spring engaging said enlarged head of said lower steering shaft and the other end of said spring engaging said stub shaft for continuously urging said upper column away from said lower column.

* * * * *